United States Patent
Chen et al.

(10) Patent No.: US 8,428,098 B2
(45) Date of Patent: Apr. 23, 2013

(54) GEO-LOCATING END-USER DEVICES ON A COMMUNICATION NETWORK

(75) Inventors: Liren Chen, San Diego, CA (US); Jack Steenstra, San Diego, CA (US); Kirk S. Taylor, San Diego, CA (US); John W. Noerenberg, II, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 732 days.

(21) Appl. No.: 11/483,268

(22) Filed: Jul. 6, 2006

(65) Prior Publication Data

US 2008/0010367 A1    Jan. 10, 2008

(51) Int. Cl.
*H04B 1/00*    (2006.01)

(52) U.S. Cl.
USPC .......... 375/133; 370/241; 370/254; 370/351; 702/150; 455/456.1; 709/223; 709/224; 709/241; 709/245

(58) Field of Classification Search .......... 370/229, 370/230, 241, 254, 351; 702/150, 186; 709/223, 709/224; 455/456.1; 375/133
See application file for complete search history.

(56) References Cited

U.S. PATENT DOCUMENTS

| | | | |
|---|---|---|---|
| 5,874,903 A | 2/1999 | Shuey et al. |
| 6,023,625 A | 2/2000 | Myers, Jr. |
| 6,108,558 A | 8/2000 | Vanderspool, II |
| 6,453,168 B1 | 9/2002 | McCrady et al. |
| 6,484,034 B1 | 11/2002 | Tsunehara et al. |
| 6,996,632 B2 | 2/2006 | Levy et al. |
| 7,035,652 B1 | 4/2006 | Kelkar |
| 7,035,936 B2 | 4/2006 | Fouquet et al. |
| 7,242,947 B2 | 7/2007 | Niu et al. |
| 7,321,331 B2 | 1/2008 | Andric et al. |
| 7,395,073 B2 | 7/2008 | Gwon et al. |
| 2002/0113735 A1 | 8/2002 | Spratt |
| 2002/0160787 A1 | 10/2002 | Chen et al. |

(Continued)

FOREIGN PATENT DOCUMENTS

| | | |
|---|---|---|
| EP | 1134940 A | 9/2001 |
| EP | 1253437 A2 | 10/2002 |

(Continued)

OTHER PUBLICATIONS

International Search report dated Dec. 14, 2007, serial No. PCT/US2007/072979, 4 pages.

(Continued)

*Primary Examiner* — Daniel Washburn
*Assistant Examiner* — Eboni Hughes
(74) *Attorney, Agent, or Firm* — Liberty E. Mann (57) ABSTRACT

A scheme is provided for determining the geographical location of an active IP device coupled to an IP network. A network path to the user device is obtained to identify a last hop device having a known first geographical location. A last leg distance between the last hop device and the user device is calculated. The last leg bandwidth, propagation time, and propagation speed are also characterized to more accurately determine the last leg distance. By combining the known first geographical location and the distance of the last hop device and user device, a geographical location for the user device is obtained. To improve the accuracy of the geographical location of the user device, multiple last hop devices with known geographical locations are employed to obtain multiple geographical areas for the user device. The intersection or overlap of these geographical areas indicates a refined geographical location of the user device.

29 Claims, 9 Drawing Sheets

U.S. PATENT DOCUMENTS

| | | |
|---|---|---|
| 2002/0194266 A1 | 12/2002 | Brebner et al. |
| 2003/0036388 A1* | 2/2003 | Rosen ........................... 455/445 |
| 2003/0046022 A1* | 3/2003 | Silverman .................... 702/150 |
| 2003/0058792 A1* | 3/2003 | Shao et al. .................... 370/229 |
| 2003/0235155 A1* | 12/2003 | Boivie et al. ................. 370/238 |
| 2004/0109417 A1 | 6/2004 | Castro et al. |
| 2004/0116134 A1 | 6/2004 | Maeda et al. |
| 2005/0021738 A1* | 1/2005 | Goeller et al. ............... 709/224 |
| 2005/0102391 A1* | 5/2005 | Ruutu et al. .................. 709/224 |
| 2005/0135257 A1* | 6/2005 | Stephens et al. ............. 370/241 |
| 2005/0148346 A1 | 7/2005 | Maloney et al. |
| 2005/0228613 A1 | 10/2005 | Fullerton et al. |
| 2006/0045011 A1* | 3/2006 | Aghvami et al. ............. 370/230 |
| 2006/0172699 A1 | 8/2006 | Goto |
| 2007/0021123 A1 | 1/2007 | A'Rafat et al. |
| 2008/0101277 A1 | 5/2008 | Taylor et al. |
| 2009/0075672 A1 | 3/2009 | Jones et al. |

FOREIGN PATENT DOCUMENTS

| | | |
|---|---|---|
| JP | 10503893 | 4/1998 |
| JP | 2004304755 A | 10/2004 |
| WO | 0157696 A | 8/2001 |
| WO | 02/03091 A | 1/2002 |
| WO | 2006/066212 A | 6/2006 |

OTHER PUBLICATIONS

OA mailed Jun. 12, 2009 for U.S. Appl. No. 11/483,067, 43 pages.
International Search Report & Written Opinion dated Nov. 28, 2007 for PCT Application Serial No. PCT/US2007/072944, 14 Pages.
EP OA mailed Apr. 29, 2009 for EP Application Serial No. 07799370.7-1248, 5 pages.
Office Action for EP Application 07 799 370.7-1248 for Qualcomm, Inc., dated Apr. 29, 2009, 5 pages.
Final Office Action mailed Dec. 2, 2009 for U.S. Appl. No. 11/483,067, 48 pages.

* cited by examiner

GEO-LOCATING END-USER DEVICES ON A COMMUNICATION NETWORK

BACKGROUND

Reference to Co-Pending Applications for Patent

The present Application for Patent is related to the following co-pending U.S. Patent Application: "Enabling GPS Support For Network Infrastructure Devices" by Kirk Taylor, et al., Ser. No. 11/483,067 filed concurrently herewith, assigned to the assignee hereof, and expressly incorporated by reference herein.

Field

Various embodiments of the invention pertain to communication networks, and particularly to a method for geographically locating an active IP device on an IP network.

Background

The advent of IP-based networks has spawned many applications, including voice-over-IP (VOIP) communication services. Voice-over-IP telephone communications are becoming widespread and, in some instances, replacing the traditional telephone services over public switched telephone networks. Such IP-based communication services are typically delivered over a broadband connection, such as a digital subscriber line (DSL), a digital cable line, and/or a wireless transceiver. VOIP data flows over a general-purpose packet-switched network, instead of traditional dedicated, circuit-switched voice transmission lines. This network often includes switches, routers, hubs, and/or other network support devices, in addition to the physical media that links those devices together. The physical links can be any, or a combination of, optical fibers, copper wires and/or various wireless links.

The nature of IP makes it difficult to geographically locate network users. This poses a problem when deploying VOIP telephone services since emergency calls, for example, cannot be easily routed to a nearby call center. That is, the geographical transparency of IP networks, where devices are identified by an IP address not location, makes it very difficult to identify the geographical location of a VOIP with any precision. In the event that the caller using a VOIP telephone is unable to provide an address, emergency services may be unable to locate them in any other way.

Following the lead of mobile phone carriers, several VOIP carriers are already implementing a technical work-around by adding global positing systems (GPS) to VOIP telephones. However, implementing GPS support on the VOIP telephones device typically results in higher purchase costs for the VOIP telephone and, sometimes, additional monthly service charges.

Another approach is to request users register the geographical location of the VOIP telephone via a separate registration process. However, this approach is burdensome since it relies on users to perform this additional registration step. Moreover, such approach is impractical since VOIP phones may be easily moved to a different geographical location and reconnected to an IP network.

Others have proposed using a round-trip ping time from given stations in the IP network as an approximation of geographic distance to a VOIP telephone or device. In addition to round-trip ping time, some have proposed using some form of triangulation of ping times from network devices with known geographical locations to approximate a geographical location for a VOIP telephone or device. However, such approaches are inaccurate or impractical due to variations in network loads, variations in the number of hops in between, processing time at each station in the network, and the large number of reference network devices with known geographical locations needed to make the method useful in widespread applications. IP networks often include fiber optic cable and any small measuring error in ping time (e.g., resulting from processing delays, variations in network loads, etc.) may result in a distance error in the range of hundreds of miles. Such large distance errors make this approach of little practical use since it fails to provide a geographical location with any significant accuracy for most applications.

Several other applications also depend or benefit from quickly and/or inexpensively locating active IP devices on a network. These applications include asset-tracking, personal monitoring and law enforcement applications.

Currently, there is no easy and inexpensive way to accurately locate the geographical position of an active IP device (e.g., VOIP telephone, etc.) on an IP network. The benefits and usage of having such geographical position within an IP network include marketing advantages and emergency support.

SUMMARY

A method is provided for determining the geographical location of a user device coupled to a communication network. A network path to the user device is obtained or determined and a first last hop network device in the network path is identified. A first geographical location of the first last hop network device is obtained and then the distance for a last leg path between the first last hop network device and the user device is determined or obtained. A first user device geographical location is then determined based on the geographical location of the first last hop network device and the last leg path distance. A route tracing utility may be executed to obtain the network path to the user device. Obtaining the distance of the last leg path may include (a) determining a transmission medium bandwidth for the last leg path, (b) determining a last-leg round-trip time for the last leg path (c) calculating a round-trip transmission time of a ping packet over the last leg path based on the transmission bandwidth and a packet size for the ping packet; (d) determining a round-trip propagation time for the last leg path by subtracting the round-trip transmission time from the last-leg round-trip time; (e) selecting a propagation speed for the transmission medium of the last leg path; and/or (f) determining a one-way distance of the last leg path based on the selected propagation speed and the round-trip propagation time.

The transmission medium bandwidth for the last leg path may be obtained by (a) obtaining a first last leg round-trip ping time for the last leg path using a first packet size, (b) obtaining a second last leg round-trip ping time for the last leg path using a second packet size, and/or (c) determining the difference between the first and second packet sizes and dividing by the difference between the first and second last leg round-trip ping times. In one implementation, the first last leg round-trip ping time is obtained by determining the time difference between a round-trip ping from a first network station to the last hop network device and a different round-trip ping from the first network station to the user device, where both pings have a first packet size. A second last leg round-trip ping time may be obtained by determining the time difference between a round-trip ping from the first network station to the last hop network device and a different round-trip ping from the first network station to the user device, where both pings have a second packet size. The pings may be high-resolution pings having microsecond resolution.

Additionally, the method may include (a) obtaining a second network path to the user device, (b) obtaining a second last hop network device in the second network path to the user device, (c) obtaining a second geographical location of the second last hop network device, (d) obtaining a distance for a second last leg path between the second last hop network device and the user device, (e) calculating the one-way distance of the second last leg path, and/or (f) determining a second user device geographical location based on the second geographical location of the second last hop network device and the distance of the second last leg path. A refined user device geographical location may then be obtained based on the overlap of the first user device geographical location the second user device geographical location. The first network path may be different than the second network path and the first last hop network device may be a different network device than then second last hop network device.

Another embodiment provides an apparatus comprising (a) a communication interface to communicatively couple the apparatus to a communication network and (b) a processing circuit coupled to the communication interface. The processing circuit may be configured to (a) obtain a network path to a user device, (b) obtain a last hop network device in the network path to the user device, (c) obtain a first geographical location of the last hop network device, (d) obtain a distance for a first last leg path between the last hop network device and the user device, and/or (e) determine a first user device geographical location based on the geographical location of the last hop network device and the distance of the first last leg path. To obtain the distance of the first last leg path, the processing circuit may be further configured to (a) send a first high-resolution ping having a first packet size to the last hop network device from a first network station to obtain a first round-trip time, (b) send a second high-resolution ping having the same first packet size to the user device from the first network station to obtain a second round-trip time, (c) subtract the first round-trip time from the second round-trip time to obtain a first overall last leg round-trip time, (d) send a third high-resolution ping having a second packet size to the last hop network device from the first network station to obtain a third round-trip time, (e) send a fourth high-resolution ping having the same second packet size to the user device from the first network station to obtain a fourth round-trip time, and (f) subtract the third round-trip time from the fourth round-trip time to obtain a second overall last leg round-trip time. A last leg round-trip propagation time is obtained by subtracting a last leg round-trip transmission time from a last leg overall round-trip time. The propagation speed for the last leg path may be determined based on the transmission medium of the last leg path. The last leg distance between the last hop network device and the user device is then obtained based on the last leg propagation time and a last leg propagation speed. The last leg round-trip transmission time may be obtained by (a) determining a transmission bandwidth for the last leg path based on the first and second packet sizes and the difference between the first and second overall last leg round-trip times, and (b) determining the last leg round-trip transmission time of a ping packet over the last leg path based on the transmission bandwidth and a packet size for the ping packet.

Another feature provides the processing circuit to (a) obtain a second network path to the user device, (b) obtain a second last hop network device in the second network path to the user device, (c) obtain a second geographical location of the second last hop network device, (d) obtain a second last leg path distance between the second last hop network device and the user device, (e) obtain a second user device geographical location based on the second geographical location of the second last hop network device and the second last leg path distance, and (f) obtain a smaller geographical location for the user device based on the overlap of the first user device geographical location the second user device geographical location.

Another embodiment provides a processing device comprising a communication interface to communicatively couple the processing device to a communication network and a circuit coupled to the communication interface. The circuit may be configured to (a) identify a last hop network device having a known first geographical location in a first network path to a user device, (b) obtain a distance for a last leg path between the last hop network device and the user device, and (c) determine a user device geographical location based on the known first geographical location and the last leg distance. The last leg distance may be determined by (1) obtaining a last leg propagation speed for a transmission medium of the last leg path, (2) obtaining a last leg propagation time, and (3) determining a last leg distance between the last hop network device and the user device based on the last leg propagation time and the last leg propagation speed.

The circuit may be further configured to obtain the last leg distance by (a) determining a first round-trip time for the last leg path using a first packet size, (b) determining a second round-trip time for the last leg using a second packet size, (c) obtaining a transmission bandwidth for a transmission medium of the last leg path, (d) obtaining a transmission time for the last leg path based on the transmission bandwidth, and (e) obtaining the last leg propagation time by subtracting the transmission time from an overall last leg round-trip time.

Yet another embodiment provides a machine-readable medium having one or more instructions for geolocating a user device communicatively coupled to a communication network. When executed by a processor the one or more instructions cause the processor to (a) identify a last hop network device having a known first geographical location in a first network path to a user device, (b) obtain the distance between the last hop network device and the user device, and (c) determine a user device geographical location based on the known first geographical location and the last leg distance.

DETAILED DESCRIPTION

In the following description, specific details are given to provide a thorough understanding of the embodiments. However, it will be understood by one of ordinary skill in the art that the embodiments may be practiced without these specific details. For example, circuits may not be shown in block diagrams in order not to obscure the embodiments in unnecessary detail.

Also, it is noted that the embodiments may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Moreover, a storage medium may represent one or more devices for storing data, including read-only memory (ROM), random access memory (RAM), magnetic disk storage mediums, optical storage mediums, flash memory devices, and/or other machine readable mediums for storing information. The term "machine readable medium" includes, but is not limited to portable or fixed storage devices, optical storage devices, wireless channels, and various other mediums capable of storing, containing, or carrying instruction(s) and/or data.

Furthermore, embodiments may be implemented by hardware, software, firmware, middleware, microcode, or a combination thereof. When implemented in software, firmware, middleware, or microcode, the program code or code segments to perform the necessary tasks may be stored in a machine-readable medium such as a storage medium or other storage means. A processor may perform the necessary tasks. A code segment may represent a procedure, a function, a subprogram, a program, a routine, a subroutine, a module, a software package, a class, or a combination of instructions, data structures, or program statements. A code segment may be coupled to another code segment or a hardware circuit by passing and/or receiving information, data, arguments, parameters, or memory contents. Information, arguments, parameters, data, and the like, may be passed, forwarded, or transmitted via a suitable means including memory sharing, message passing, token passing, and network transmission, among others.

One feature provides a scheme for determining the geographical location of an active IP device coupled to an IP network. This approach combines several techniques which results in a faster geo-locating process with improved accuracy. Network infrastructure equipment is used as location reference points thereby eliminating intermediate hops and processing delays. The scheme also compensates for transformation delays and triangulates with multiple end stations to achieve greater accuracy. A high-resolution ping utility may be employed to further reduce the potential geographical location of the IP device.

Figure 1:
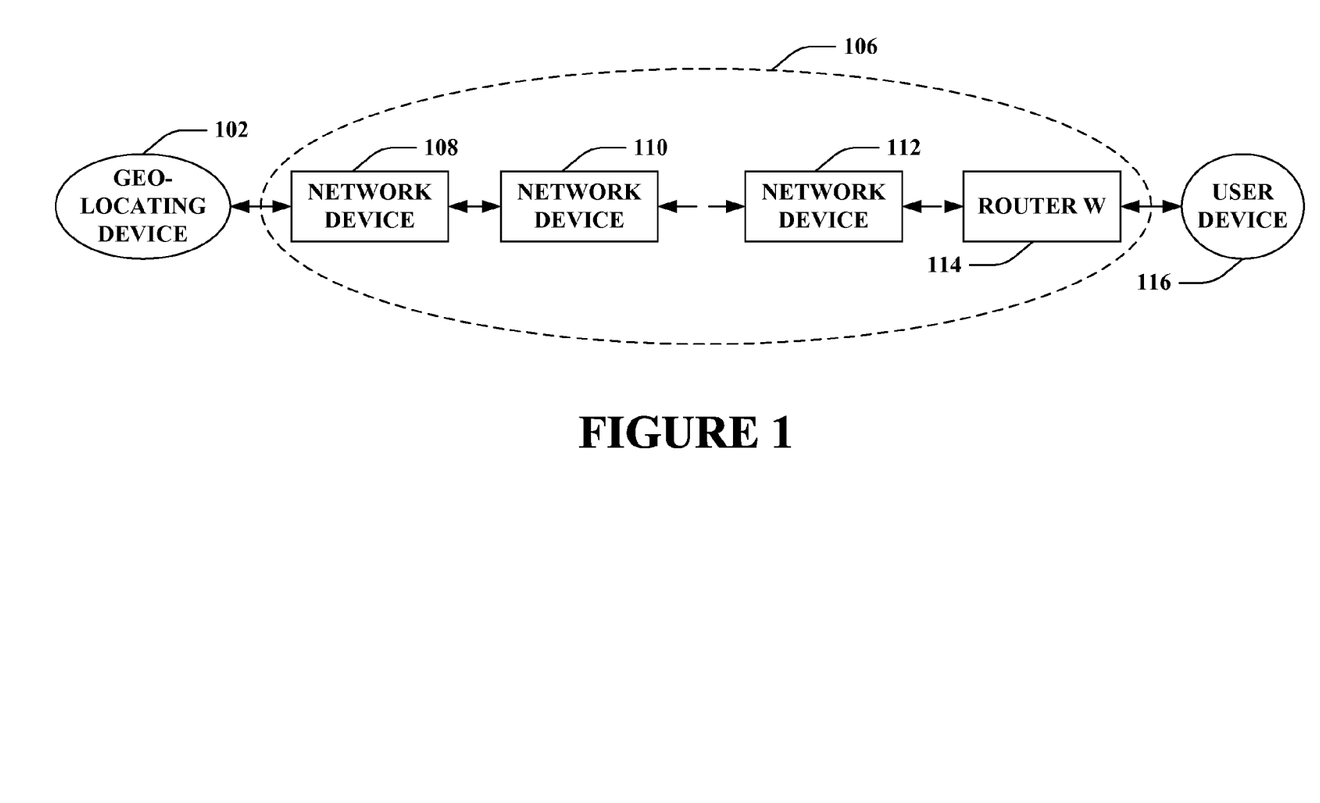
FIG. 1 illustrates an IP network in which a novel geolocation scheme may be implemented to narrow the geographical location of a end-user IP device on the network.

FIG. 1 illustrates an IP network in which a novel geolocation scheme may be implemented to narrow the geographical location of an end-user IP device on the network. IP network 106 may include various network devices 108, 110, 112, and 114, such as router, switches, hubs, etc., that facilitate the communication of packets across the network. A geo-locating device 102 (e.g., server or dedicated device) may be communicatively coupled to IP network 106 and user device 116 (e.g., VOIP telephone, etc).

Geo-locating device 102 is configured to determine a geographical location of user device 116 which it can reach through IP network 106. In doing so, geo-locating device 102 addresses variations in network loads, variations in the number of network devices or "hops" in between, and/or the processing time at each hop. A hop may be a device coupled to the network through which IP packets travel between two points (e.g., geo-locating device 102 and user device 116).

In one implementation, geo-locating device 102 relies on a known geographical location of a first network device (e.g., Router W 114), on the path to user device 116, to reduce the measurement error introduced due to network 106 loads, processing delays, and/or transmission delays. First network device 114 may have a known geographical location and is a last hop for IP packets transmitted to user device 116. Geo-locating device 102 determines the distance between first network device 114 to user device 116 to establish a geographical location for user device 116.

Figure 2:
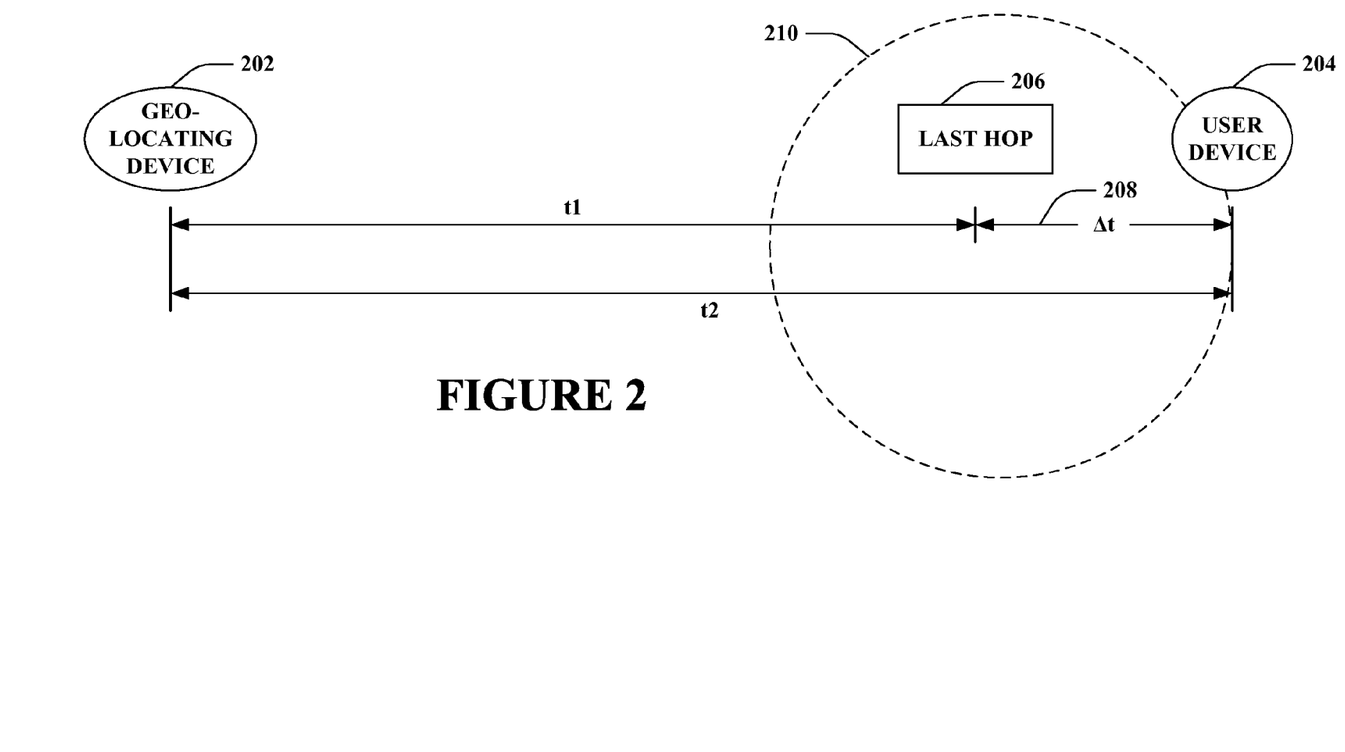
FIG. 2 illustrates one approach to determining the geographical location of an IP-based user device on a network.

FIG. 2 illustrates one approach to determining the geographical location of an IP-based user device on a network. To determine the location of user device 204, a geo-location device 202 determines the last hop device 206 on the network before reaching the user device 204. Last hop device 206 may be a network device which has a known geographical location or is able to determine its geographical location (e.g., via GPS or other means). Knowing the geographical location of last hop device 206, geo-locating device 202 then determines the last leg distance from last hop device 206 to the user device 204.

Geo-locating device 202 may determine which network device is the last hop device 206 in various ways. It may employ a route tracing utility to identify the network devices (e.g., routers, etc.) traversed to reach user device 204, thereby obtaining the path taken and IP address of the network devices or hops along the way. From this path information, geo-locating device 202 can ascertain the last hop device before reaching the user device. The last hop device 206 may be a network device having a known geographical location (or an ascertainable geographical location) which is closest to user device 204 along the obtained network path. For example, the geo-locating device 202 may access a table of known network devices and find the last hop device based on an IP address. That is, in the path to the user device 204, the IP address of the network device prior to reaching the user device 204 is checked to determine if it has a known geographical location. If not, then the IP address of the next closest network device is checked, and so on, until a geographical location can be determined. While in the ideal case the last hop device 206 is also the last network device in the path to user device 206, in other circumstances it may not be the last network device in the path to user device 206. That is, the geographical location of the closest device(s) along the path may not be ascertainable or available so the closest network device with an ascertainable geographical location may be used as the last hop device 206.

In alternative implementations, the network devices may have a GPS system that enables them to know their geographical location. Once geo-locating device 202 determines which network device is the last hop device 206 (e.g., via a route tracing utility), it may query that device for its geographical location.

By using the closest known geographical location as a base point, rather than a time measurement, geo-locating device 202 is able to minimize the effects of transmission delays, processing delays, and network traffic delays between itself and last hop device 206. This greatly improves the accuracy of the geographical location of user device 204 versus using a time measurement since even a 1 millisecond delay may result in an error of hundreds of miles.

To more accurately determine the location of the user device 204, geo-locating device 202 then determines or approximates the distance between the last hop device 206 and user device 204, referred to as the last leg 208. In one implementation, this may be achieved by taking a round-trip time measurement to the last hop device 206, taking a round-trip measurement to user device 204, and then calculating the difference between these round-trip measurements by subtracting the round-trip time measurement to the last hop device 206 from the round-trip measurement to user device 204 to obtain the round-trip time between last hop 206 and user device 204. This may be accomplished, for example, by using a high-resolution pinging utility (e.g., having a resolution of 1 microsecond) to ping last hop device 206 to obtain a travel time t1 and then pinging user device 204 to obtain a travel time t2. A time difference $\Delta t$ is determined by t2−t1. The round trip pings to the last hop device 206 and user device 204 may be done in close proximity in time so as to minimize the effects of varying network traffic or loads, and processing loads. This also minimizes the chance that the network topology changes on a dynamic network, which may lead to the ping packets taking different paths and resulting in invalid measurements.

In order to more accurately determine the distance of the last leg 208, the round-trip time of the last leg can be separated into the transmission time and the propagation time. Transmission time is defined as the time it takes for the network device to send the first bit of a packet to the last bit of the packet. Propagation delay is the time it takes for the packet to travel across the physical media of the network link between the network hubs. Transmission speed of the last leg 208 may be characterized in order to separate the transmission time from the propagation time. In particular, the transmission speed of the last leg 208 is estimated or determined to remove path-dependent transmission delays. In one implementation, different ping sizes are used to infer the transmission speed of the last leg 208.

Figure 3:
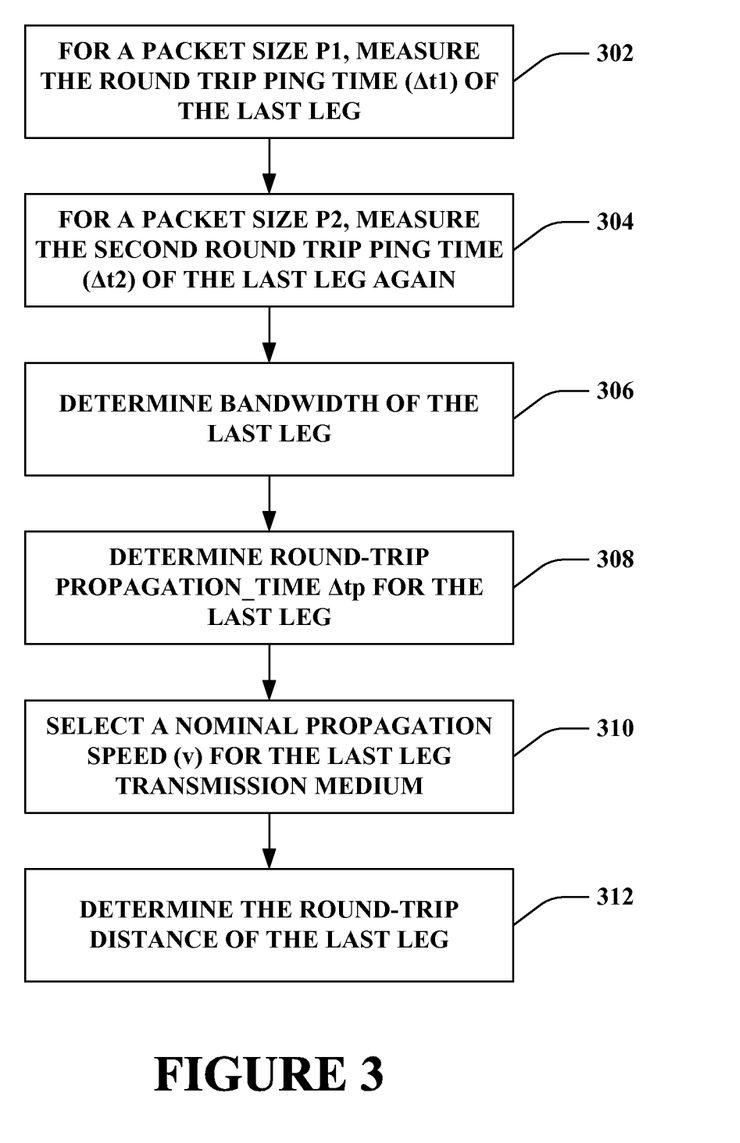
FIG. 3 illustrates a method for calculating the transmission delay across a last leg segment and the distance of the last leg according to one implementation.

FIG. 3 illustrates a method for calculating the transmission delay across a last leg segment and the distance of the last leg according to one implementation. With a packet size of P1, the round trip ping time ($\Delta t1$) of the last leg (e.g., last leg 208 in FIG. 2) may be measured 302. For example, using a packet size P1, a first ping is used to determine the round-trip time t1 between the geo-locating device and the last hop device. Using the same packet size P1, a second ping is used to determine the round-trip time t2 between the geo-locating device and the user device. The difference between round-trip times t2 and t1 defines a first round-trip ping time $\Delta t1$ for the last leg. This process is repeated with a packet size of P2 to obtain a second round trip ping time $\Delta t2$ for the last leg 304. The first round-trip ping time $\Delta t1$ is defined as transmission_time1+propagation_time1, and the second round-trip ping time $\Delta t2$ is defined as transmission_time2+propagation_time2. The propagation time is directly related to the propagation speed of the electromagnetic signal across the physical media of the last leg path and how far the signal has to travel. It is independent of the measuring packet size P1 or P2. Therefore, for the same last leg path, propagation_time1 equals propagation_time2. This means that transmission times (e.g., transmission_time1 and transmission_time2) are determined by the size of the packet (e.g., P1 and P2) being transferred, divided by the bandwidth of the last leg link.

Often, the bandwidth is relatively stable when ping measurements are taken in close proximity in time. Therefore, $$\Delta t1 = (P1/\text{Last\_leg\_bandwidth}) + \text{propagation\_time}$$

$$\Delta t2 = (P2/\text{Last\_leg\_bandwidth}) + \text{propagation\_time}.$$

The last leg bandwidth can then be calculated as the difference between packet sizes P2 and P1 divided by the difference in round-trip ping times $\Delta t2$ and $\Delta t1$ such that:

$$\text{Last\_leg\_bandwidth} = (P2-P1)/(\Delta t2-\Delta t1). \tag{306}$$

The round-trip propagation_time $\Delta tp$ of the last leg can then be calculated as the difference between an overall last leg round-trip time and the transmission time, such that:

$$\Delta tp = \Delta t1 - P1 \times ((\Delta t2 - \Delta t1)/(P2-P1)). \tag{308}$$

A nominal propagation speed v for the last leg transmission medium is then selected 310. This selection may be done based on characterizing the physical transmission medium of the last leg based on its exhibited bandwidth, for example. That is, depending on the determined last leg bandwidth, the last leg may be characterized as twisted pair copper wire, coaxial cable, fiber optic, etc.). The one-way distance of the last leg can then be determined as:

$$\text{Last\_leg\_distance} = v \times \Delta tp_{one-way} \tag{312}$$

where v is the propagation speed across the last leg and $\Delta tp_{one-way}$ is the propagation time for one way of the last leg. In this example, $\Delta tp_{one-way}$ equals the round-trip propagation time ($\Delta tp$) divided by 2.

Electromagnetic signals propagate at a constant speed on a transmission media. Since the transmission medium of the last leg may be characterized using the last leg bandwidth, the propagation speed v may be the nominal propagation speed for that transmission medium. The following is a look-up table for medium propagation speeds may be used to estimate the propagation speed v along the last leg:

| Transmission Medium | Propagation Speed |
|---|---|
| Thick Coaxial | .77 c (231,000 km/sec) |
| Thin Coaxial | .65 c (195,000 km/sec) |
| Twisted Pair Copper | .59 c (177,000 km/sec) |
| Fiber Optic | .66 c (198,000 km/sec) |
| AUI Cable | .65 c (195,000 km/sec) | where c is the speed of light.

Referring again to FIG. 2, knowing the propagation speed v and round-trip propagation time $\Delta tp$ over last leg 208, the one-way distance of last leg 208 can be calculated (e.g., distance=propagation speed×round-trip time $\Delta tp/2$). Note that, in one implementation, multiple round-trip measurements are obtained and the smallest propagation time $\Delta tp$ is used to determine the distance from the last hop device 206 to the user device 204. In some implementations, a high-resolution ping is utilized for determining the time $\Delta t$ across last leg 208 to more accurately estimate the distance of last leg 208.

However, even an accurate estimate of last leg 208 distance still results in a potentially large area in which user device 204 may be located. In particular, user device 204 may be located within a circular region 210 in any direction from the last hop device 206. One feature provides a method for reducing the potential geographic space in which user device 204 may be located.

Figure 4:
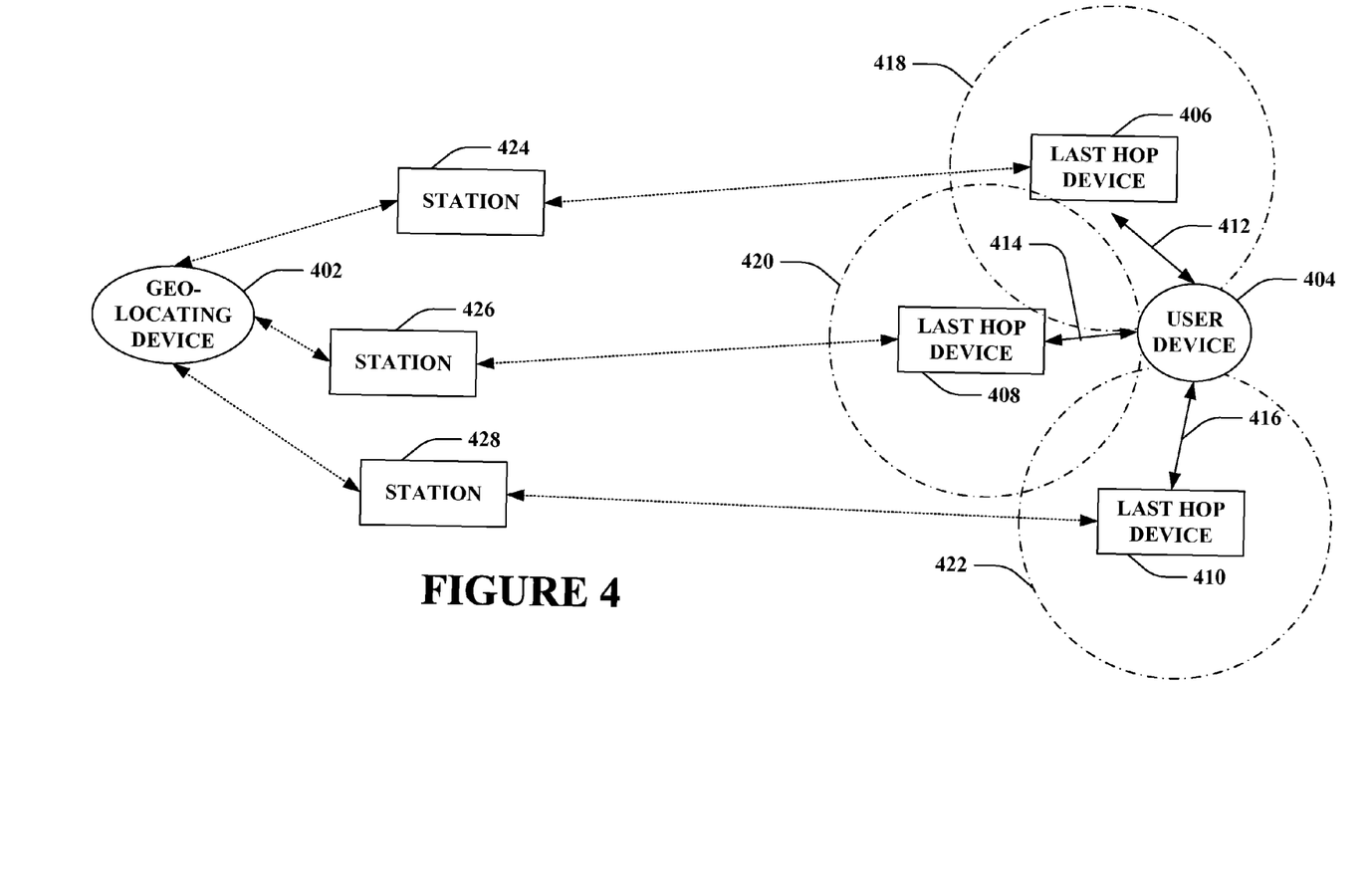
FIG. 4 illustrates how a plurality of network devices with known geographical locations may be used to more accurately determine the geographical location of an IP-based user device on a network.

FIG. 4 illustrates how a plurality of network devices with known geographical locations may be used to more accurately determine the geographical location of an IP-based user device on a network. A geo-locating device 402 can ping a user device 404 over an IP network as described in FIG. 2. However, instead of using just a single last hop device, multiple last hop devices 406, 408, and 410 are employed to more accurately identify the geographical location of user device 404. In particular, a plurality of network devices having known geographical locations are used as last hop devices 406, 408, and 410. For each last hop device 406, 408, and 410, the distance to the user device 404 is determined as illustrated and described with reference to FIGS. 2 and 3. Thus, last leg 412, 414, and 416 distances are obtained from each of the plurality of last hop devices 406, 408, and 410. Since the location of each last hop device 406, 408, and 410 is known, the last leg 412, 414, and 416 distances can be used to determine geographical regions 418, 420, and 422 for the user device 404.

To further narrow the location of the user device 404, the measurements from last hop device 406, 408, and 410, are combined. For example, the geographical location of user device 404 may be determined by triangulation or by the area where each of the regions 418, 420, and 422 intersect or overlap. Thus, using a plurality of last hop devices 406, 408, and 410 can further improve the accuracy of the geographical location determination of user device 404.

In one implementation, in order to obtain the different last hop devices 406, 408, and 410, different stations 424, 426, and 428 are used to perform a trace route utility. That is, each station 424, 426, and 428 traces the network path to user device 404 to determine if different last hop devices 406, 408, and 410 (having known geographical locations) can be obtained. If so, then individual ping tests are performed by the different stations 424, 426, and 428 to obtain their corresponding last legs 412, 414, and 416 distances to user devices 404. Once the last leg 412, 414, and 416 distances are obtained and geographical regions 418, 420, and 422 are defined, geo-locating device 402 uses this information to determine where these regions overlap or intersect, thereby narrowing the location of user device 404.

Figure 5:
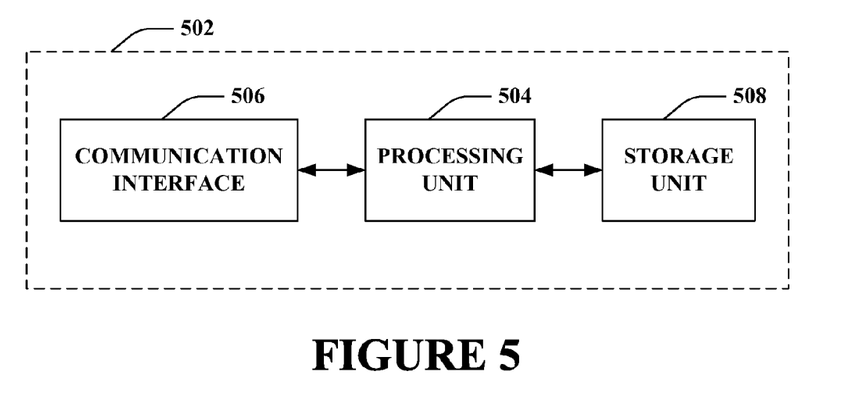
FIG. 5 illustrates a geo-locating device that may be coupled to an IP network and configured to determine the geographical location of a user device on the network.

FIG. 5 illustrates a geo-locating device that may be coupled to an IP network and configured to determine the geographical location of a user device on the network. Geo-locating device 502 may include a processing unit 504 coupled to a communication interface 506 and a storage device 508. Communication interface 506 may serve to couple geo-locating device 502 to the IP network and permit it to communicate with other devices on the network. Storage device 508 may serve to store the geographical locations of network devices, user devices, and/or store parameters used in determining the geographical location of a user device. Processing unit 504 may be configured to perform trace routes to identify the known geographical location of one or more last hop devices, perform high-resolution ping tests to determine the distance from the one or more last hop devices to the user device, and/or triangulate one or more last leg distances to determine a geographical location for the user device.

In various implementations, geo-locating device 502 may be a station on the IP network that is configured to perform ping tests and/or geo-location of a user device either directly or based on directions from another network device. Alternatively, geo-locating device 502 may be configured to direct other network devices to perform ping tests and/or geo-location of a user device.

Figure 6:
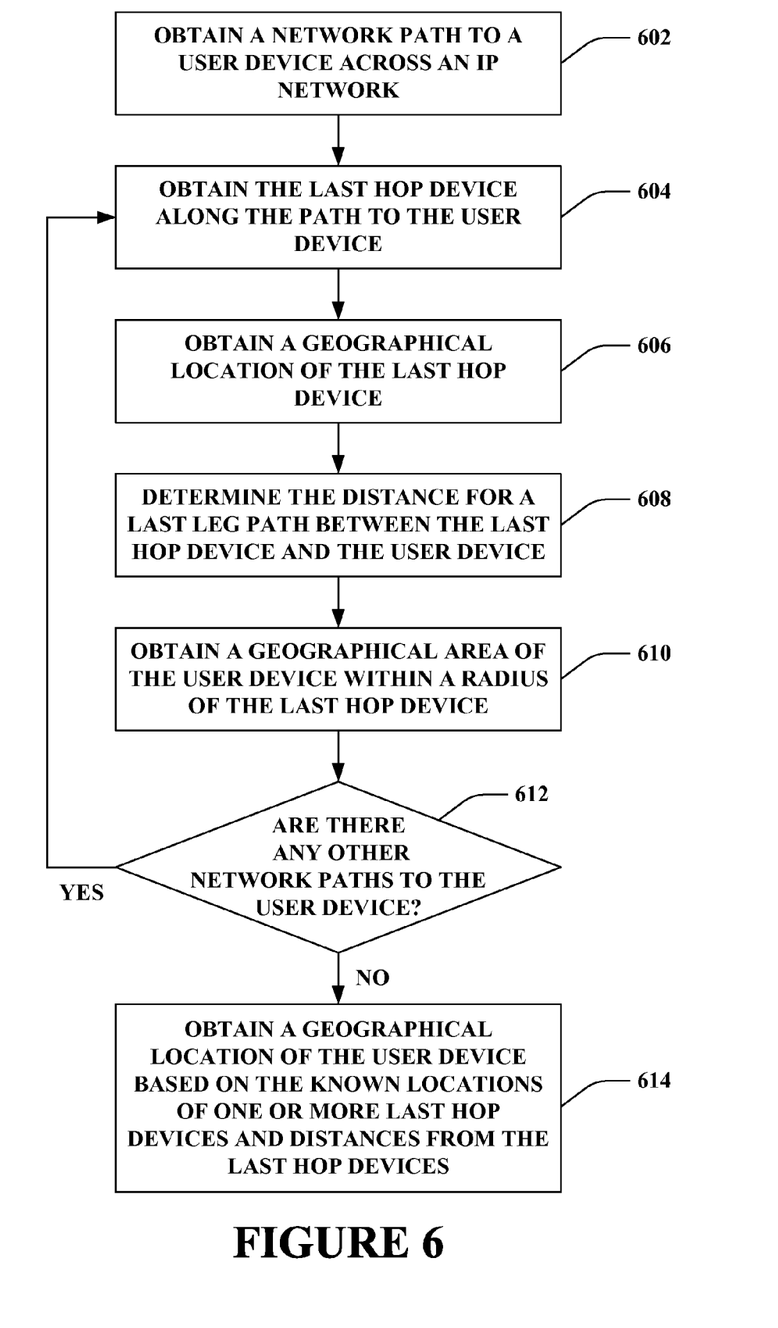
FIG. 6 illustrates a method for determining the geographical location of a user device on an IP network.

FIG. 6 illustrates a method for determining the geographical location of a user device on an IP network. This method assumes that the IP network includes network devices (e.g., routers, etc.) having known geographical locations that can be used as reference points. This may be accomplished by providing GPS capabilities on such network devices or configuring the geographical location of network devices upon installation.

A network path to the user device is obtained across an IP network 602. This may be accomplished, for example, by running a trace route utility to determine the network path to the user device. The last hop device along the network path to the user device is obtained 604. From this network path information, the last hop device on the path is determined. The geographical location of the last hop device is then obtained 606. This may be accomplished by querying the last hop device, or identifying its location based on its IP address. The distance for a last leg path between the last hop device and the user device is then determined 608. A geographical area of the user device is obtained within a radius of the last hop device 610.

Additionally, if other last hop devices are available over multiple paths of the IP network to the user device 612, these can be used to more accurately determine the geographical location of the user device. That is, the location of the user device may be further refined by using multiple last hop devices having known geographical locations. For each of the multiple last hop devices, a region for the user device is determined as described above. That is, for each last hop device having a known geographical location, a distance to the user device is determined, which can be used to determine a region of the user device. A more accurate geographical location of the user device can then be determined based on the known locations of one or more last hop devices and distances from the last hop devices 614. In particular, the location where the two or more regions (e.g. circles 418, 420, 422 in FIG. 4) overlap identifies the geographical location of the user device.

In yet another implementation, the last leg distance between the last hop device and the user device may be ascertained in other ways without deviating from the invention. For example, a last hop device may be able to determine the distance to a user device by using a network protocol having timestamp support and clock synchronization. The last hop device and user device may operate on a communication network having clock synchronization and time stamping of transmissions. The hop device may also know the bandwidth of the last leg to the user device since it may have established this as part of its communications with the user device. Thus, from time stamped messages received from the user device, the last hop device can determine the overall time from the user device to the last hop device, the transmission time, and as a result, the propagation time. Using a nominal propagation speed for the transmission media of the last leg and knowing the propagation time, the last hop device may determine the distance to the user device. In some implementations, network infrastructure devices, such as the last hop device, may be configured to obtain a last leg distance to a user device upon request by another network device and provide that distance to the requesting network device.

Figure 7:
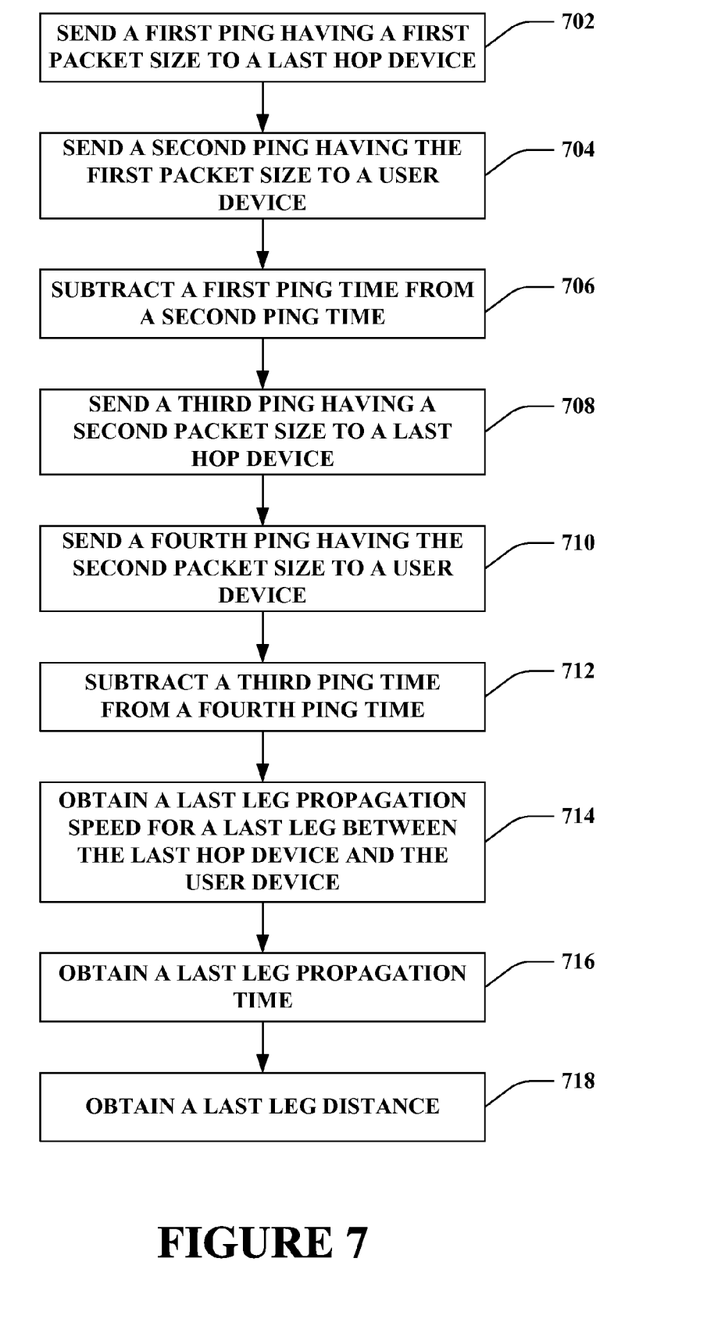
FIG. 7 illustrates a method for determining a last leg distance between a last hop device and a user device.

FIG. 7 illustrates a method for determining a distance between a last hop device and a user device. The round-trip time from the last hop device to the user device is determined by performing separate ping tests to the last hop device and to the user device and then taking the difference between the two ping times. For a first packet size, a first ping is sent to the last hop device from a first network station to obtain a first round-trip time 702. For the same first packet size, a second ping is sent to the user device from the first network station to obtain a second round-trip time 704. The first round-trip time is subtracted from the second round-trip time to obtain a first last leg round-trip time 706. For a second packet size, a third ping is sent to the last hop device from a first network station to obtain a third round-trip time 708. For the same second packet size, a fourth ping is sent to the user device from the first network station to obtain a fourth round-trip time 710. The third round-trip time is subtracted from the fourth round-trip time to obtain a first last leg round-trip time 712. In some implementations, multiple ping tests may be performed (to the last hop device and user device) and the round times that result in the smallest last leg round-trip time is used.

A last leg propagation speed is obtained for the last leg path from the last hop device to the user device 714. Since the transmission medium of the last leg may be characterized using the last leg bandwidth, the propagation speed may be the nominal propagation speed for that transmission medium. The last leg bandwidth may be determined by using multiple pings of different sizes to characterize the transmission medium bandwidth (as discussed in step 306 of FIG. 3 for instance). Having ascertained a bandwidth, a transmission medium having such bandwidth may be selected and the propagation speed for that medium is selected. Alternatively, a transmission medium is assumed based on other factors, such as residential versus commercial locations, age of the network, etc.

A last leg propagation time is obtained by subtracting a last leg transmission time from an overall last leg time 716. As discussed with regard to step 308 of the method in FIG. 3, the transmission time may be determined based on the last leg bandwidth. The transmission time is determined by a ping packet size divided by the bandwidth of the last leg link.

The last leg distance between the last hop device and the user device is then obtained based on the last leg propagation time and the last leg propagation speed 718.

In one implementation, multiple high-resolution ping tests are performed (preferably, near in time to each other) and the smallest difference in transmission times ($\Delta t$) is used as the round-trip transmission time of the last leg (e.g., between the last hop device and the user device).

One or more of the steps and functions illustrated in FIGS. 3, 6 and 7 may be rearranged and/or combined into a single step or embodied in several steps without departing from the invention. Additional steps may also be added without departing from the invention. The apparatus, devices, and/or components illustrated in FIGS. 1, 2, 4 and/or 5 may be configured to perform the methods, features, or steps illustrated in FIGS. 3, 6 and/or 7.

It should be noted that the foregoing embodiments are merely examples and are not to be construed as limiting the invention.

Figure 8:
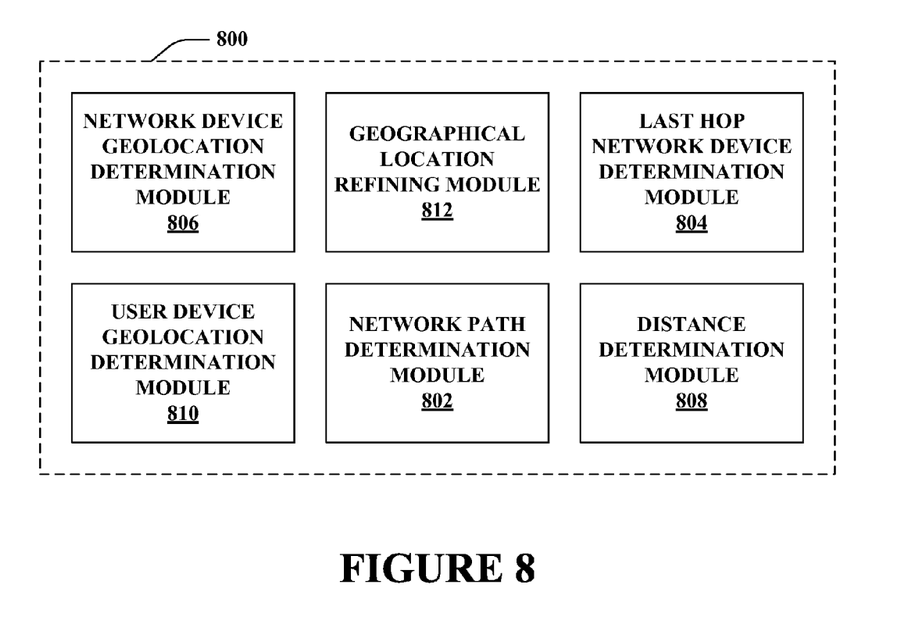
FIGS. 8 and 9 illustrate network devices embodying various novel features.

FIG. 8 illustrates a networked apparatus 800 including a network path determination module 802 configured to obtain a network path to a user device, a last hop network device determination module 804 configured to obtain a last hop network device in the network path to the user device, a network device geolocation determination module 806 configured to obtain a first geographical location of the last hop network device, a distance determination module 808 configured to obtain the distance for a last leg path between the last hop network device and the user device, and a user device geolocation determination module 810 configured to determine a first user device geographical location for the user device based on the geographical location of the last hop network device and the distance of the last leg path.

Accordingly, a networked apparatus may comprise means for obtaining a network path to a user device, means for obtaining a last hop network device in the network path to the user device, means for obtaining a first geographical location of the last hop network device, means for obtaining the distance for a last leg path between the last hop network device and the user device, and means for determining a first user device geographical location for the user device based on the geographical location of the last hop network device and the distance of the last leg path. Here, the means for obtaining a network path may comprise network path determination module 802, the means for obtaining a last hop network device may comprise last hop network device determination module 804, the means for obtaining a first geographical location may comprise network device geolocation determination module 806, the means for obtaining the distance may comprise distance determination module 808, and/or the means for determining a first user device geographical location may comprise user device geolocation determination module 810, as shown in FIG. 8.

The networked apparatus 800 may further include a network path determination module 802 for obtaining a second network path to the user device, a last hop network device determination module 804 for obtaining a second last hop network device in the second network path to the user device, a network device geolocation determination module 806 for obtaining a second geographical location of the second last hop network device, a distance determination module 808 for obtaining the distance between the second last hop network device and the user device, a user device geolocation determination module 810 for obtaining a second user device geographical location based on the second geographical location of the second last hop network device and the distance between the second last hop network device and the user device, and a geographical location refining module 812 for obtaining a smaller geographical location for the user device based on the overlap of the first user device geographical location the second user device geographical location.

Figure 9:
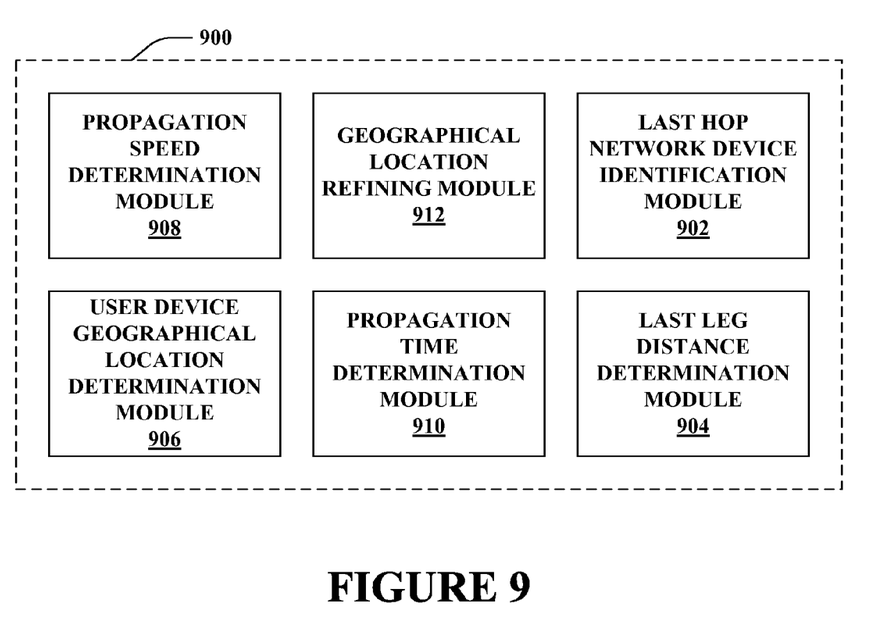

FIG. 9 illustrates a geo-locating network device 900 including a last hop network device identification module 902 configured to identify a last hop network device having a known first geographical location in a first network path to a user device, a last leg distance determination module 904 configured to obtain a last leg distance between the user device and the last hop network device, and a user device geographical location determination module 906 configured to determine a geographical location for the user device based on the known first geographical location and the last leg distance. The geo-locating network device 900 may further include a propagation speed determination module 908 for obtaining a propagation speed between the user device and the last hop network device, a propagation time determination module 910 for obtaining a propagation time between the user device and the last hop network device, the last hop network device identification module 902 for identifying a second last hop network device having a known second geographical location in a second network path to the user device, the last leg distance determination module 904 for obtaining a second last leg distance between the user device and the second last hop network device, and/or a geographical location refining module 912 for refining the geographical location of the user device based on the second geographical location and the second last leg distance.

Accordingly, a geo-locating network device may comprise means for identifying a last hop network device having a known first geographical location in a first network path to a user device, means for obtaining a last leg distance between the user device and the last hop network device, and means for determining a geographical location for the user device based on the known first geographical location and the last leg distance. Here, the means for identifying a last hop network device may comprise last hop network device identification module 902, the means for obtaining a last leg distance may comprise last leg distance determination module 904, and/or the means for determining a geographical location may comprise user device geographical location determination module 906, as shown in FIG. 9.

The various components described in FIGS. 8 and/or 9 may be embodied by one or more of the components previously described and/or illustrated herein. It should be noted that one or more elements of networked apparatus 800 and/or geolocating network device 900 may be rearranged and/or combined without affecting the operation of the device. Also, additional elements, components, steps, and/or functions may also be added without departing from the invention. In various implementations, one or more of the components or modules illustrated in FIG. 8 and/or 9 may be implemented as software or as part of a processor.

The description of the embodiments is intended to be illustrative, and not to limit the scope of the claims. As such, the present teachings can be readily applied to other types of apparatuses and many alternatives, modifications, and variations will be apparent to those skilled in the art.

What is claimed is:

1. A method for determining the geographical location of a user device coupled to a communication network, comprising:
   obtaining a network path to the user device;
   obtaining a first last hop network device in the network path to the user device;
   obtaining a first geographical location of the first last hop network device;
   obtaining a plurality of pairs of ping times to the user device and corresponding ping times to the first last hop network device;
   obtaining a smallest time difference among the plurality of pairs of ping times to the user device and corresponding ping times to the first last hop network device;
   determining a distance for a last leg path between the first last hop network device and the user device using, at least in part, the smallest time difference obtained; and
   determining a first user device geographical location for the user device based on the geographical location of the first last hop network device and the last leg path distance.

2. The method of claim 1, further comprising:
   executing a route tracing utility to obtain the network path to the user device.

3. The method of claim 1, wherein the first last hop network device is a network device having a known geographical location.

4. The method of claim 1, wherein obtaining the distance of the last leg path further comprises:
   determining a transmission medium bandwidth for the last leg path;
   determining a last leg round-trip time for the last leg path based at least in part on the difference between the ping times;
   calculating a round-trip transmission time of a ping packet over the last leg path based on the transmission bandwidth and a packet size for the ping packet;
   determining a round-trip propagation time for the last leg path by subtracting the round-trip transmission time from the last leg round-trip time;
   selecting a propagation speed for the transmission medium of the last leg path; and
   determining a one-way distance of the last leg path based on the selected propagation speed and the round-trip propagation time.

5. The method of claim 4, wherein the transmission medium bandwidth for the last leg path is obtained by
   obtaining a first last leg round-trip ping time for the last leg path using a first packet size;
   obtaining a second last leg round-trip ping time for the last leg path using a second packet size;
   determining the difference between the first and second packet sizes and dividing by the difference between the first and second last leg round-trip ping times.

6. The method of claim 4, wherein the propagation speed is selected based on the transmission medium of the last leg path.

7. The method of claim 5, wherein the first last leg round-trip ping time is obtained by
   determining the time difference between a round-trip ping from a first network station to the first last hop network device and a different round-trip ping from the first network station to the user device, where the pings have a first packet size, and
   wherein the second last leg round-trip ping time is obtained by
   determining the time difference between a round-trip ping from the first network station to the first last hop network device and a different round-trip ping from the first network station to the user device, where the pings have a second packet size.

8. The method of claim 7, wherein high-resolution pings having microsecond resolution are used to obtain the first and second last leg round-trip ping times.

9. The method of claim 1, further comprising:
   obtaining a second network path to the user device;
   obtaining a second last hop network device in the second network path to the user device;
   obtaining a second geographical location of the second last hop network device;
   obtaining a distance for a second last leg path between the second last hop network device and the user device, wherein the distance is obtained in part by ascertaining a difference between a ping time to the user device and a ping time to the second last hop network device, wherein the ping times are high-resolution ping times having microsecond resolution; and
   determining a second user device geographical location for the user device based on the second geographical location of the second last hop network device and the second last leg path distance.

10. The method of claim 9, further comprising:
    obtaining a refined geographical location for the user device based on the overlap of the first user device geographical location the second user device geographical location.

11. The method of claim 9, Wherein the first network path is different than the second network path and the first last hop network device is a different network device than the second last hop network device.

12. An apparatus comprising:
    a communication interface to communicatively couple the apparatus to a communication network;
    a processing circuit coupled to the communication interface and configured to:
       obtain a network path to a user device;
       obtain a last hop network device in the network path to the user device;

obtain a first geographical location of the last hop network device;
obtain a plurality of pairs of ping times to the user device and corresponding ping times to the last hop network device;
obtain a smallest time difference among the plurality of pairs of ping times to the user device and corresponding ping times to the last hop network device;
determine the distance for a last leg path between the last hop network device and the user device using, at least in part, the smallest time difference; and
determine a first user device geographical location for the user device based on the geographical location of the last hop network device and the distance of the last leg path.

13. The apparatus of claim 12, wherein the processing circuit is configured to:
send a first high-resolution ping having a first packet size to the last hop network device from a first network station to obtain a first round-trip time;
send a second high-resolution ping having the same first packet size to the user device from the first network station to obtain a second round-trip time;
subtract the first round-trip time from the second round-trip time to obtain a first overall last leg round-trip time;
send a third high-resolution ping having a second packet size to the last hop network device from the first network station to obtain a third round-trip time;
send a fourth high-resolution ping having the same second packet size to the user device from the first network station to obtain a fourth round-trip time; and
subtract the third round-trip time from the fourth round-trip time to obtain a second overall last leg round-trip time.

14. The apparatus of claim 13, wherein the processing circuit is further configured to:
obtain a last leg round-trip propagation time by subtracting a last leg round-trip transmission time from a last leg overall round-trip time;
obtain a propagation speed for the last leg path based on the transmission medium of the last leg path; and
obtain the last leg path distance based on the last leg propagation time and the last leg propagation speed.

15. The apparatus of claim 14, wherein the processing circuit, to obtain the last leg round-trip transmission time, is further configured to:
determine a transmission bandwidth for the last leg path based on the first and second packet sizes and the difference between the first and second overall last leg round-trip times; and
determine the last leg round-trip transmission time of a ping packet over the last leg path based on the transmission bandwidth and a packet size for the ping packet.

16. The apparatus of claim 12, wherein the processing circuit is further configured to:
obtain a second network path to the user device;
obtain a second last hop network device in the second network path to the user device;
obtain a second geographical location of the second last hop network device;
obtain the distance between the second last hop network device and the user device;
obtain a second user device geographical location based on the second geographical location of the second last hop network device and the distance between the second last hop network device and the user device; and
obtain a smaller geographical location for the user device based on the overlap of the first user device geographical location the second user device geographical location.

17. A networked apparatus comprising:
means for obtaining a network path to a user device;
means for obtaining a last hop network device in the network path to the user device;
means for obtaining a first geographical location of the last hop network device;
means for obtaining a plurality of pairs of ping times to the user device and corresponding ping times to the last hop network device;
means for obtaining a smallest time difference among the plurality of pairs of ping times to the user device and corresponding ping times to the last hop network device;
means for determining the distance for a last leg path between the last hop network device and the user device using, at least in part, the smallest time difference; and
means for determining a first user device geographical location for the user device based on the geographical location of the last hop network device and the distance of the last leg path.

18. The networked apparatus of claim 17, further comprising:
means for obtaining a second network path to the user device;
means for obtaining a second last hop network device in the second network path to the user device;
means for obtaining a second geographical location of the second last hop network device;
means for obtaining the distance between the second last hop network device and the user device;
means for obtaining a second user device geographical location based on the second geographical location of the second last hop network device and the distance between the second last hop network device and the user device; and
means for obtaining a smaller geographical location for the user device based on the overlap of the first user device geographical location the second user device geographical location.

19. A processing device comprising:
a communication interface to communicatively couple the processing device to a communication network;
a circuit coupled to the communication interface and configured to
identify a last hop network device having a known first geographical location in a first network path to a user device;
obtain a plurality of pairs of ping times to the user device and corresponding ping times to the last hop network device;
obtain a smallest time difference among the plurality of pairs of ping times to the user device and corresponding ping times to the last hop network device;
determine a last leg distance between the last hop network device and the user device based, at least in part, on the smallest time difference; and
determine a user device geographical location based on the known first geographical location and the last leg distance.

20. The processing device of claim 19, wherein the circuit is further configured to:
determine a first round-trip time for a last leg path using a first packet size;
determine a second round-trip time for the last leg path using a second packet size; and obtain the transmission bandwidth for the transmission medium of the last leg path based at least in part on the first and second round-trip times.

21. The processing device of claim 20, wherein the first and second round-trip times are obtained using a plurality of high-resolution pings.

22. The processing device of claim 19, wherein the circuit is further configured to:
- identify a second last hop network device having a known second geographical location in a second network path to the user device;
- obtain a second last leg distance between the user device and the second last hop network device; and
- refine the user device geographical location based on the second geographical location and the second last leg distance.

23. A non-transitory machine-readable storage medium having one or more instructions for determining a geographic location of a user device communicatively coupled to a communication network, which when executed by a processor causes the processor to:
- identify a last hop network device having a known first geographical location in a first network path to a user device;
- obtain a plurality of pairs of ping times to the user device and corresponding ping times to the last hop network device;
- obtain a smallest time difference among the plurality of pairs of ping times to the user device and corresponding ping times to the last hop network device;
- determine a last leg distance between the last hop network device and the user device based at least in part on the smallest time difference; and
- determine a user device geographical location based on the first geographical location and the last leg distance.

24. The non-transitory machine-readable storage medium of claim 23, having one or more instructions which when executed by a processor causes the processor to further:
- obtain a last leg propagation time based on one or more round-trip time measurements between the last hop network device and the user device using a plurality of high-resolution pings; and
- refine the last leg distance based upon the last leg propagation time.

25. The non-transitory machine-readable storage medium of claim 24, having one or more instructions which when executed by a processor causes the processor to further:
- obtain a last leg propagation speed by characterizing the bandwidth between the last hop network device and the user device based on the one or more round-trip time measurements with different packet sizes; and
- refine the last leg distance based upon the last leg propagation speed.

26. The method of claim 1, wherein the ping times to the user device are obtained based at least in part on pings from an entity to the user device, and wherein the ping times to the first last hop network device are obtained based at least in part on pings from the entity to the first last hop network device.

27. The method of claim 1, wherein the first last hop network device has a known or ascertainable geographical location which is closest to the user device along the network path.

28. The method of claim 1, wherein:
- one or more of the ping times to the user device and ping times to the first last hop network device are high-resolution ping times having microsecond resolution.

29. The method of claim 4, wherein the transmission medium bandwidth is determined in accordance with at least one of a residential location, a commercial location, and an age of the last leg path of the communication network, or subsets thereof.

* * * * *